US010212326B2

(12) United States Patent
Leung et al.

(10) Patent No.: US 10,212,326 B2
(45) Date of Patent: Feb. 19, 2019

(54) NOTIFICATIONS FOR CONTROL SHARING OF CAMERA RESOURCES (71) Applicant: Microsoft Technology Licensing, LLC, Redmond, WA (US)

(72) Inventors: Jenny Y. Leung, Kirkland, WA (US); Trevor Baron, Bellevue, WA (US); Maria C. Lei, Bellevue, WA (US); Vishal Jain, Redmond, WA (US); Mei L. Wilson, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/356,138

(22) Filed: Nov. 18, 2016

(65) Prior Publication Data
US 2018/0146127 A1 May 24, 2018

(51) Int. Cl.
*H04N 5/232* (2006.01)
*G06F 9/52* (2006.01)
*H04N 101/00* (2006.01)

(52) U.S. Cl.
CPC ........... *H04N 5/23203* (2013.01); *G06F 9/52* (2013.01); *H04N 5/23222* (2013.01);
(Continued)

(58) Field of Classification Search
CPC ........... H04N 21/4223; H04N 21/4147; H04N 1/00307; G06F 3/01–3/05; G06F 3/1683;
(Continued)

(56) References Cited

U.S. PATENT DOCUMENTS 6,133,941 A    10/2000 Ono
7,315,904 B2    1/2008 Geib et al.
(Continued)

FOREIGN PATENT DOCUMENTS

EP     1475968 A1    11/2004
WO    0184301 A2    11/2001
WO  2005015340 A2    2/2005

OTHER PUBLICATIONS

Moshchuk, et al., "Resource Management for Web Applications in ServiceOS", In Technical Report MSR-TR-2010-56, May 18, 2010, pp. 1-15.
(Continued)

*Primary Examiner* — Xi Wang
(74) *Attorney, Agent, or Firm* — Arent Fox LLP (57) ABSTRACT

Methods and devices for providing notifications for camera resource availability may include receiving requests from a plurality of applications for control of a camera resource. The methods and devices may include providing control of the camera resource to a selected application from the plurality of applications when another application does not have control of the camera resource. The methods and devices may include sending a control notification to one or more applications, including at least one of the plurality of applications indicating that the selected application has control of the camera resource. The methods and devices may include sending an availability notification to the one or more applications, including the at least one of the plurality of applications indicating that the selected application has released the control of the camera resource.

20 Claims, 7 Drawing Sheets (52) U.S. Cl.
CPC . *H04N 2101/00* (2013.01); *H04N 2201/0072* (2013.01); *H04N 2201/0074* (2013.01); *H04N 2201/0084* (2013.01)

(58) Field of Classification Search
CPC .......... G06F 1/1698; G06F 2213/3814; H04W 84/12
USPC ....... 348/211.3, 211.4, 211.9, 211.11, 231.9, 348/211.99; 718/100, 104
See application file for complete search history.

(56) References Cited

U.S. PATENT DOCUMENTS

| | | | |
|---|---|---|---|
| 2004/0128382 A1 | 7/2004 | Shimoda et al. | |
| 2005/0268302 A1* | 12/2005 | Geib | G06F 9/4881 718/100 |
| 2006/0050155 A1* | 3/2006 | Ing | G06F 3/005 348/231.99 |
| 2006/0187338 A1* | 8/2006 | May | H04N 5/2254 348/375 |
| 2009/0222842 A1* | 9/2009 | Narayanan | G06F 9/542 719/328 |
| 2012/0023503 A1* | 1/2012 | Trivi | G06F 9/526 718/104 |
| 2012/0209923 A1 | 8/2012 | Mathur et al. | |
| 2012/0314127 A1 | 12/2012 | Syed et al. | |
| 2013/0097203 A1 | 4/2013 | Bhattacharjee et al. | |
| 2016/0086138 A1* | 3/2016 | Lee | G06Q 10/1095 705/7.19 |
| 2016/0092944 A1 | 3/2016 | Taylor et al. | |

OTHER PUBLICATIONS

"Round Robin Arbitration", http:/rtlery.com/articles/round-robin-arbitration, Published on: 2012, 5 pages.

"Camera Resource Management", http:/developer.blackberry.com/native/documentation/graphics_multimedia/camera/resource_management.html, Published on: May 7, 2015, 4 pages.

Campbell, Stephen, "Can I Share My Webcam With Multiple Programs Simultaneously?", http://searchunifiedcommunications.techtarget.com/answer/Can-I-share-my-webcam-with-multiple-programs-simultaneously, Published on: Mar. 2013, 4 pages.

Xu, et al., "Non-stationary Resource Allocation Policies for Delay-constrained Video Streaming: Application to Video over Internet-of-Things-enabled Networks", In IEEE Journal on Selected Areas in Communications, vol. 32, Issue 4, Apr. 2014, 14 pages.

"International Search Report and Written Opinion Issued in PCT Application No. PCT/US2017/061214", dated Feb. 22, 2018, 14 Pages.

* cited by examiner

NOTIFICATIONS FOR CONTROL SHARING OF CAMERA RESOURCES

BACKGROUND

The present disclosure relates to a computer device, and more particularly, to video capture.

Typically when an application has exclusive control of a camera resource, other applications attempting to use the camera resources receive an access violation and go into an error state. Based on the current solutions, once exclusive control is obtained, the exclusive control is not available to other applications until the existing exclusive control is relinquished. This may lead to a bad user experience and/or less than optimal performance of the system, as some applications may not need exclusive control while other applications may not be able to operate without exclusive control.

Thus, there is a need in the art for improvements in sharing camera resources.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a computer device. The computer device may include a memory to store data and instructions, a processor in communication with the memory, and an operating system in communication with the memory and processor. The operating system may be operable to receive requests from a plurality of applications for control of a camera resource, provide control of the camera resource to a selected application from the plurality of applications when another application does not have control of the camera resource, send a control notification to one or more applications, including at least one of the plurality of applications indicating that the selected application has control of the camera resource, and send an availability notification to the one or more applications, including the at least one of the plurality of applications when the controlling application has released the camera resource.

Another example implementation relates to a method for providing notifications for camera resource availability. The method may include receiving, at an operating system executing on a computer device, requests from a plurality of applications for control of a camera resource. The method may include providing, by the operating system, control of the camera resource to a selected application of the plurality of applications when another application does not have control of the camera resource. In addition, the method may include sending, by the operating system, a control notification to one or more applications, including at least one of the plurality of applications indicating that the selected application has control of the camera resource. The method may also include sending an availability notification to the one or more applications, including the at least one of the plurality of applications indicating that the selected application has released the camera resource.

Another example implementation relates to computer-readable medium storing instructions executable by a computer device. The computer-readable medium may include at least one instruction for causing the computer device to receive requests from a plurality of applications for control of a camera resource. The computer-readable medium may include at least one instruction for causing the computer device to provide control of the camera resource to a selected application from the plurality of applications when another application does not have control of the camera resource. The computer-readable medium may include at least one instruction for causing the computer device to send a control notification to one or more applications, including at least one of the plurality of applications indicating that the selected application has control of the camera resource. The computer-readable medium may include at least one instruction for causing the computer device to send an availability notification to the one or more applications, including the at least one of the plurality of applications indicating that the selected application has released the control of the camera resource.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

The present disclosure provides systems and methods for notifying applications of the availability of exclusive use of a camera resources. The systems and methods allow applications to dynamically adapt to available camera resources in an environment where camera resources can be shared with other applications.

According to one feature, the systems and methods include sending a notification to applications indicating that another application has taken control of a camera resource. Since the application in control may determine the characteristics of the resource, and hence the characteristics of the resource to be shared, the present disclosure allows for fault tolerance. In other words, by providing notification of control, the present systems and methods enable an application to adjust to accept a shared use of the resource under the existing conditions (e.g., control not available, the set of characteristics at which the resource is currently being used in control, etc.), thereby enabling access to the resource even under less than preferred conditions.

According to another feature, the systems and methods including sending a notification to applications indicating that another application has relinquished control of a camera resource. This second type of notification allows any application that desires control of a camera resource to request it upon availability, rather than having to waste resources on making requests when the control is not available.

The present disclosure also provides systems and methods for dynamically switching between a shared mode and a control mode of using or controlling a camera resource. The systems and methods allow applications to dynamically adapt to available camera resources and share camera resources with other applications. The systems and methods allow an application to have control of a portion of the camera resources while sharing other portions of the resources with other applications. A shared mode has been introduced that allows an application to obtain access to a camera resource that is being controlled by another application, but the shared mode does not allow the application obtaining the camera resource in the shared mode to control characteristics of the camera resources. As such, the application operating in the shared mode has to accept the given characteristics of the camera resource, even if they are not preferable for the operation of the application operating in shared mode.

The systems and methods also allow applications to dynamically downgrade or upgrade consumption of camera resources depending on external factors. For example, the systems and methods allow an application to switch between control of a camera resource and shared usage of the camera resource depending on whether the application needs control of the camera resource and/or whether or not another application having a higher control priority trumps an existing control of the camera resource by an application. The system and methods also allow pre-emption of the control mode by another application, such as when an application having a higher control priority desires to use camera resources already under control by another application having a lesser control priority. Applications may dynamically lower themselves from a controlling application of the camera resource to become a shared client of the camera resource and may reacquire control at a later time upon receiving a release notification of control of the camera resource. Thus, the systems and methods provide flexibility so that applications that need control of the camera resource may get control, while applications that need access to the camera resource may also access the camera resource, even if the application does not control the camera resource.

Figure 1:
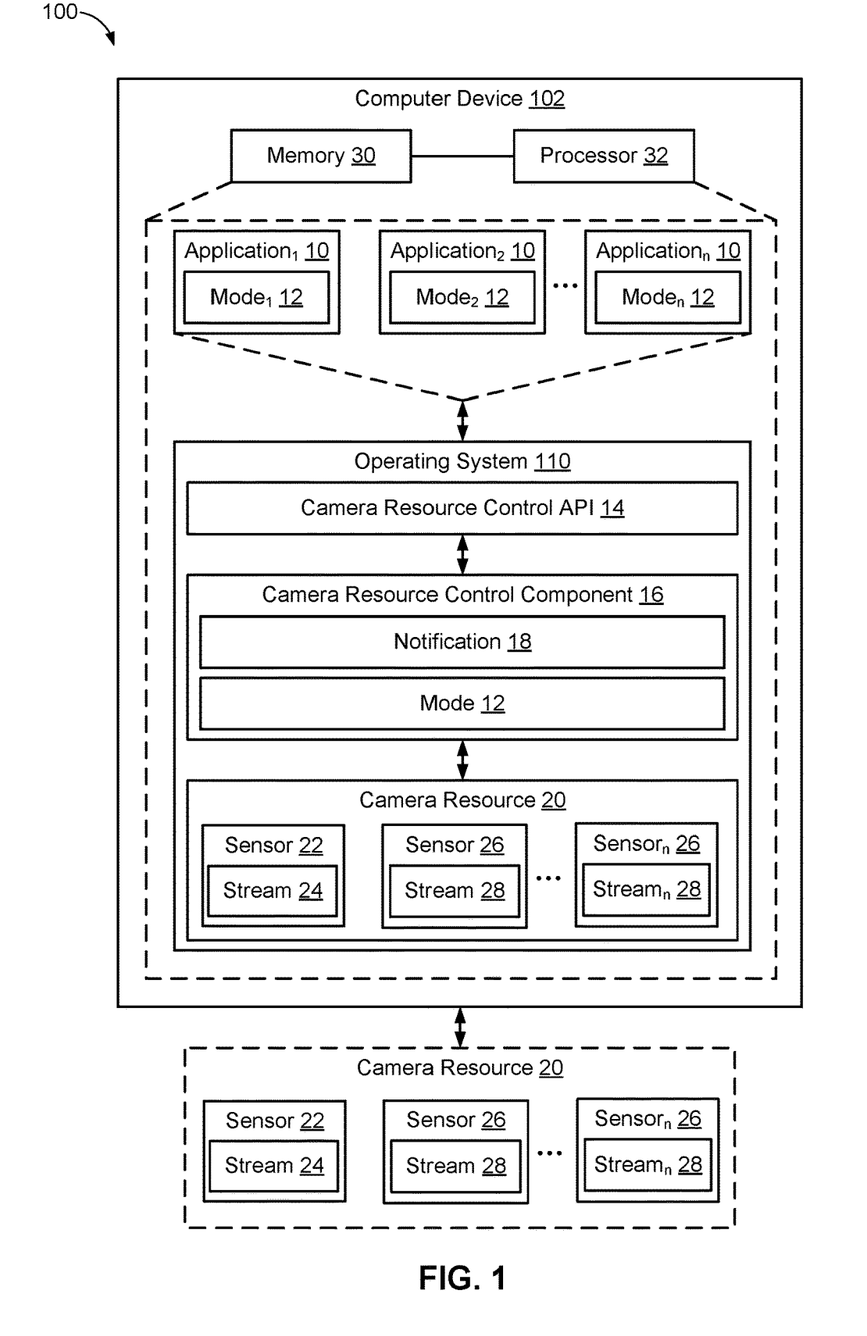
FIG. 1 is a schematic block diagram of an example device in accordance with an implementation of the present disclosure.

Referring now to FIG. 1, an example computer device 102 for sharing camera resources 20 may include one or more applications 10 executed or processed by processor 32 and/or memory 30 of computer device 102. Applications 10 may want to use one or more camera resources 20 in communication with computer device 102 to capture a scene and/or perform video processing.

Computer device 102 in accordance with the present disclosure may include an operating system 110 executed by processor 32 and/or memory 30 of computer device 102, and including a camera resource 20 for capturing a scene, a camera resource control component 16 for controlling the use of camera resource 20 by applications 10, and a camera resource application programming interface (API) 14 for communication between applications 10 and camera resource control component 16. Memory 30 may be configured for storing data and/or computer-executable instructions defining and/or associated with operating system 110, and processor 32 may execute operating system 110. An example of memory 30 can include, but is not limited to, a type of memory usable by a computer, such as random access memory (RAM), read only memory (ROM), tapes, magnetic discs, optical discs, volatile memory, non-volatile memory, and any combination thereof. An example of processor 32 can include, but is not limited to, any processor specially programmed as described herein, including a controller, microcontroller, application specific integrated circuit (ASIC), field programmable gate array (FPGA), system on chip (SoC), or other programmable logic or state machine. Computer device 102 may include any mobile or fixed computer device, which may be connectable to a network. Computer device 102 may be, for example, a computer device such as a desktop or laptop or tablet computer, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices.

Camera resource 20 may include at least one sensor 22 that produces a stream 24 of data. In addition, camera resource 20 may include one or more additional sensors 26 that produce streams 28 of data. Sensors 22 and 26 may include, but are not limited to, an infrared (IR) sensor, a color sensor, such as a red green blue (RGB) sensor, a monochrome sensor, a depth sensor, a thermal sensor, or any other type of camera sensor. In one implementation, application 10 may want to control camera resource 20. For example, application 10 may want to control sensor 22 of camera resource 20 or control one or more sensors 26. Alternatively, application 10 may want to control both sensor 22 and one or more sensors 26 of camera resource 20. In another implementation, application 10 may want to control a plurality of camera resources 20. For example, application 10 may want to control sensor 22 of a first camera resource 20 and control sensors 22 and 26 of a second camera resource 20. In another implementation, application 10 may want to use camera resource 20 but may not necessarily need to control camera resource 20.

Application 10 may communicate with at least one camera resource control API 14 to send a request for use of camera resource 20. The request may also include a camera resource identifier to indicate which camera resources 20, application 10 may want to use. Application 10 may have a mode 12 that indicates whether application 10 wants to control camera resource 20 or application 10 wants to share camera resource 20. Mode 12 may be modified by application 10. For example, application 10 may set mode 12 to a shared mode and application 10 will start streaming from camera resource 20 as a shared application. When in a shared mode, application 10 has a lesser amount of control on the camera resource. For example, application 10 may not choose a media type or frame rate or resolution. In addition, application 10 may not control the brightness adjustment, exposure adjustment, white balance, ISO, zoom, and/or a focus adjustment of camera resource 20. Image processing that may occur in a shared mode may include, but is not limited to, background image processing, tracking motion, video calls, recording video, gesture recognition, or image processing that may be tolerant of lower quality or resolution of images.

Application 10 may also set mode 12 to a control mode and application 10 will start streaming from camera resource 20 in a control mode. When in a control mode, application 10 may, for example, change a stream format of the camera resource, set controls on camera resource 20 (e.g., brightness, focus, exposure), prepare a low lag photo or video, capture a variable photo sequence, and/or stream from the camera resource as a control client. As such, application 10 may dynamically change its streaming access to camera resource 20 and switch between a shared mode and a control mode of using or controlling camera resource 20. In addition, mode 12 may be modified by a camera resource control component 16.

Camera resource control API 14 may abstract the mode 12 of application 10 when a request is received from application 10 for use of camera resource 20. Camera resource control API 14 may communicate the request and/or the mode 12 of application 10 to camera resource control component 16. Camera resource control component 16 may control camera resource 20 sharing between applications 10 on computer device 102.

Camera resource control component 16 may receive a request from application 10 to use camera resource 20. Camera resource control component 16 may determine whether camera resource 20 is currently controlled by another application. If another application is controlling camera resource 20, camera resource control component 16 may generate a notification 18 that notifies the other applications on computer device 102 that an application has control of camera resource 20. Notification 18 may be used by other applications to wait to request control of camera resource 20 instead of wasting resources on making requests when control of camera resource 20 is not available.

Camera resource control component 16 may also determine whether the mode 12 of application 10 is a shared mode or a control mode. If mode 12 of application 10 is a shared mode, camera resource control component 16 may provide application 10 shared access to camera resource 20. Application 10 may adjust to a shared use of camera resource 20 under the existing conditions at which camera resource 20 is currently being used. As such, one application may have control of a portion of the camera resources while sharing other portions of the resources with other applications.

If mode 12 of application 10 is a control mode, camera resource control component 16 may compare the control priority of application 10 with the control priority of the application currently in control of camera resource 20. When the control priority of application 10 is higher than the control priority of the application currently in control of camera resource 20, camera resource control component 16 may preempt the control of camera resource 20 and change the control of camera resource 20 to application 10. For example, camera resource control component 16 may change the mode 12 of the application currently in control of camera resource 20 from a control mode to a shared mode. In addition, camera resource control component 16 may change the mode 12 of application 10 to a control mode of camera resource 20. When the control priority of application 10 is lower than the control priority of the application currently in control of camera resource 20, camera resource control component 16 may maintain the control of camera resource 20 with the application currently in control.

If another application is not controlling camera resource 20, camera resource control component 16 may grant control of camera resource to application 10. For example, camera resource control component 16 may change the mode 12 of application 10 to a control mode. Camera resource control component 16 may transmit the mode 12 to camera resource control API 14 and camera resource control API 14 may transmit the mode 12 to application 10. In a control mode of camera resource 20, application 10 may change a stream format, set controls on camera resource 20, and stream as a control application from camera resource 20. Camera resource control component 16 may generate a notification 18 that notifies other applications on computer device 102 that application 10 is in control of camera resource 20.

When application 10 releases control of camera resource 20, camera resource control component 16 may generate a notification 18 that notifies other applications on computer device 102 that application 10 has relinquished control of camera resource 20. Notification 18 may allow any other application that desires control of camera resource 20 to request it upon availability. As such, applications may dynamically adapt to available camera resources and share camera resources with other applications. Moreover, applications may dynamically downgrade or upgrade consumption of camera resource.

One example may include Skype trying to initiate a video call while another application has control of the RGB camera resources and is operating the RGB camera at a lower resolution. While Skype prefers to have a higher resolution, based on receiving the notification that control of the RGB camera resources is held by another application, Skype may initiate the video call at the lower resolution that is available for sharing. When the application releases control of the RGB camera resources, a notification may be sent to Skype (and all other applications who have registered to receive such notifications) indicating the availability of the RGB camera resources. Upon receiving the notification, Skype may attempt to take control of the camera resource and have the call moved to a higher resolution.

Figure 2A:
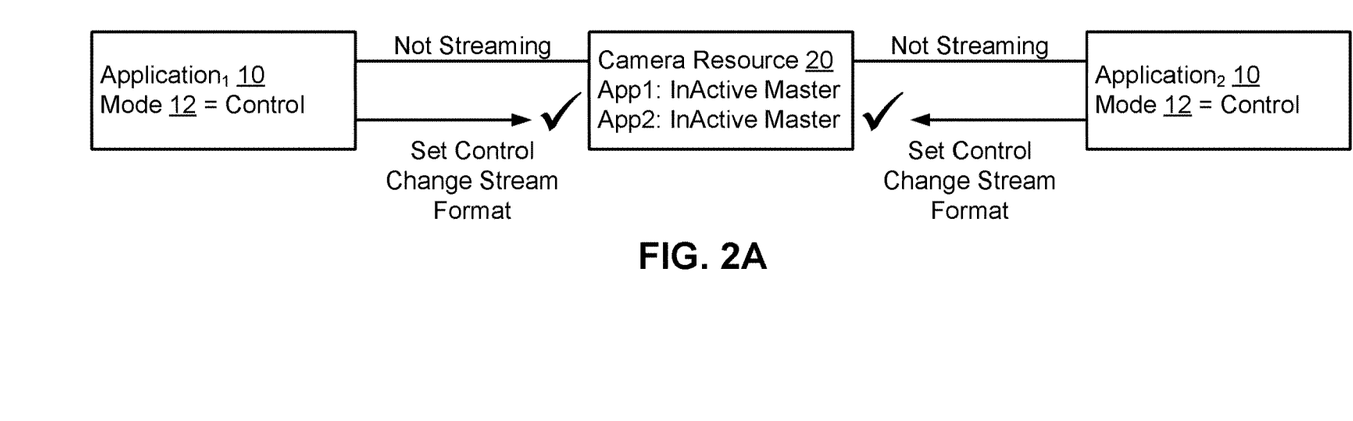
FIGS. 2A-2C illustrate example controls of camera resources in accordance with an implementation of the present disclosure.

Referring now to FIGS. 2A-2C, example controls of camera resources are illustrated. FIG. 2A illustrates example multiple inactive control mode applications. A control application (e.g., mode 12 of application 10 is set to a control mode) that is not actively streaming from a camera resource 20 may be an inactive control client. A camera resource 20 may have multiple inactive control clients all of which may be configured to use the camera resource 20, as illustrated in FIG. 2A.

Figure 2B:
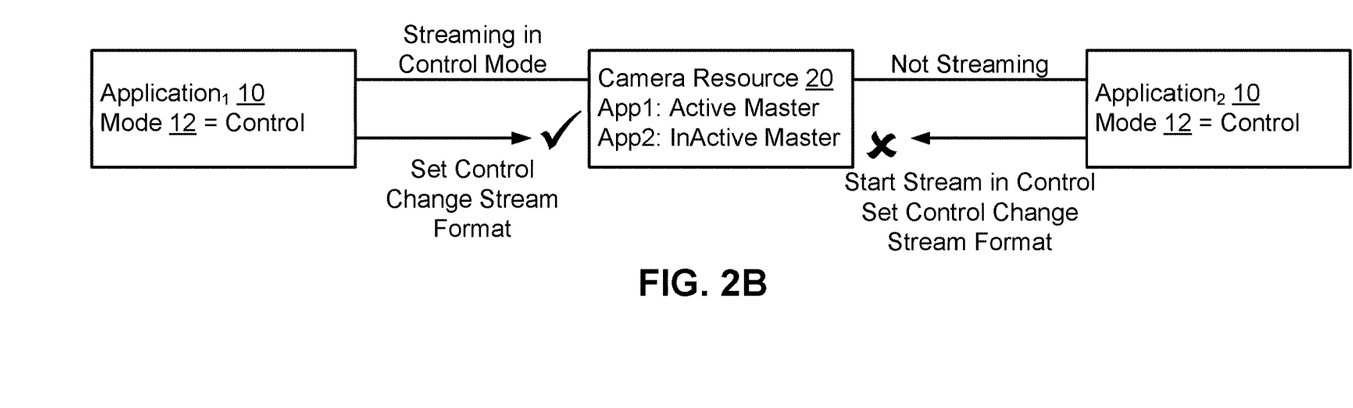

In addition, each camera resource 20 may have multiple active share applications (e.g., mode 12 of applications 10 is set to a shared mode). However, each camera resource 20 may only have one active control mode application (e.g., mode 12 of application 10 is set to a control mode and application 10 is actively streaming from camera resource 20). When the control application successfully starts streaming in a control mode from the camera resource 20, the control application will have full control of the camera resource 20. Other inactive control applications will not be able to operate on the camera resource 20, as illustrated in FIG. 2B.

Figure 2C:
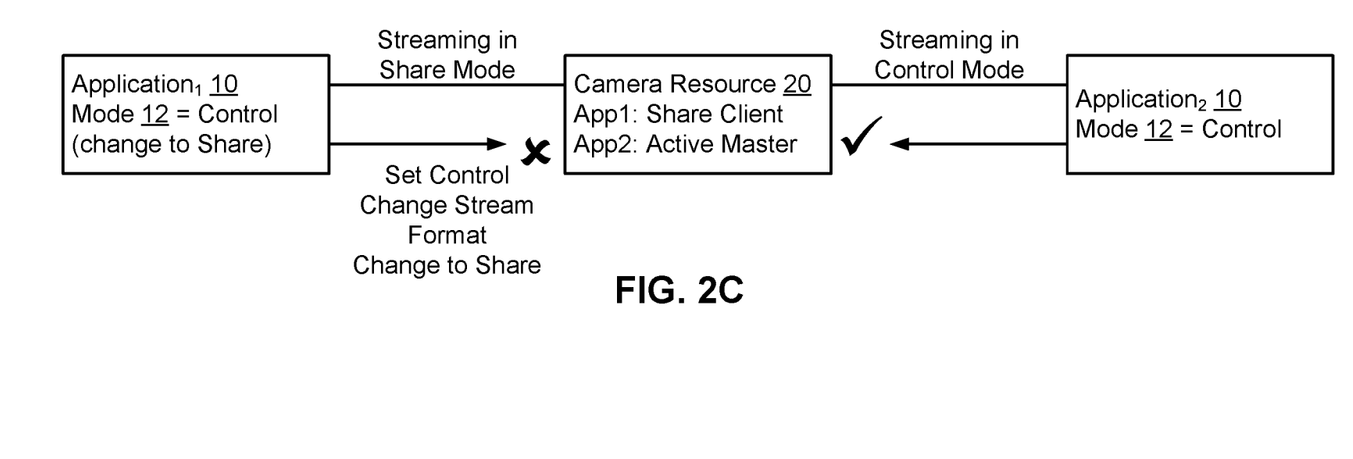

FIG. 2C illustrates an example where multiple control applications may stream from the same camera resource 20 by allowing a control application to change its streaming access level from the camera resource 20. When a control application sets its stream mode to a shared mode, the control application starts streaming as a shared application. As such, multiple control applications may share streaming of the camera resource 20, as illustrated in FIG. 2C.

Figure 3:
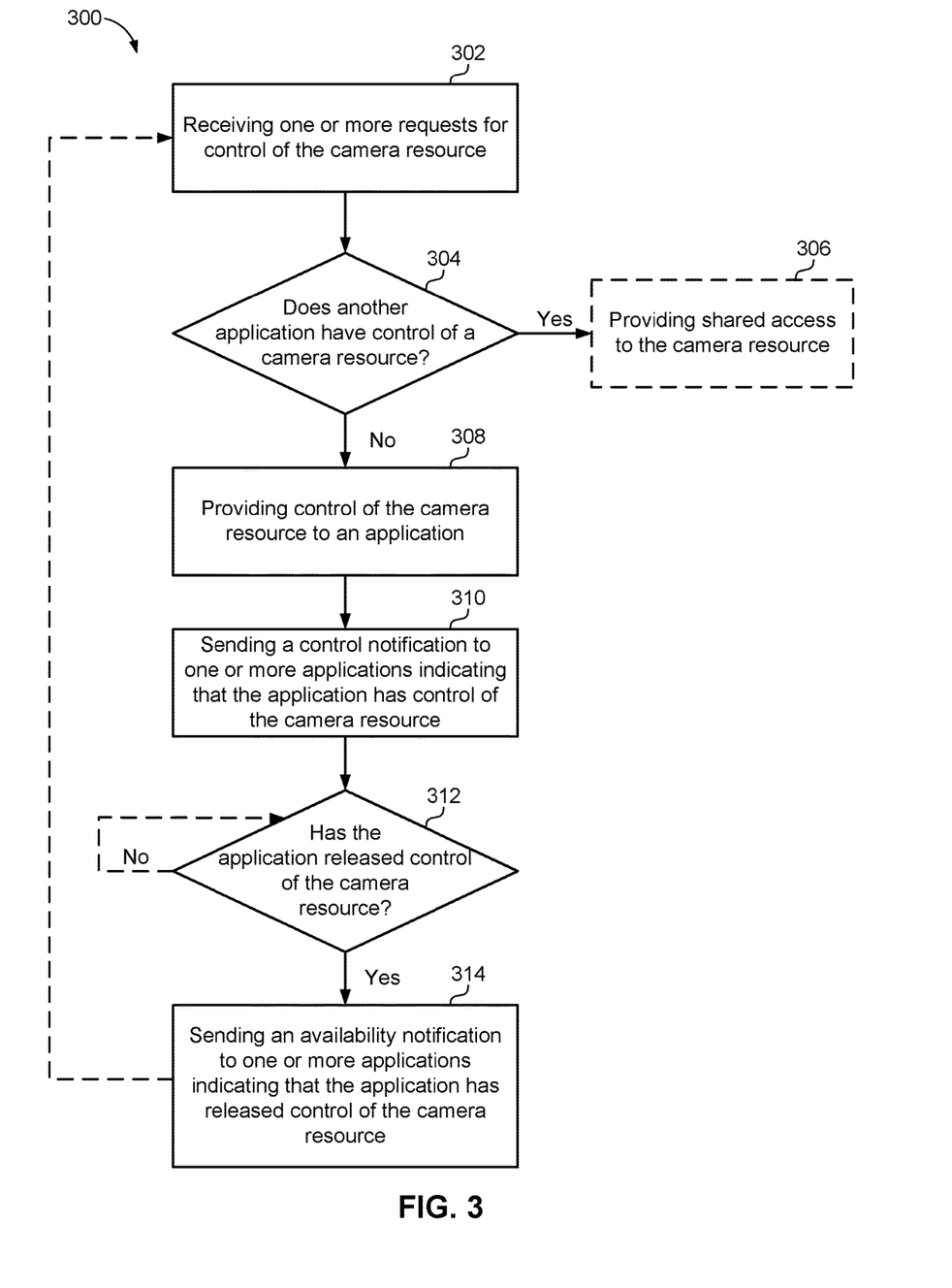
FIG. 3 is a flow chart of a method for providing notifications for camera resource availability in accordance with an implementation of the present disclosure.

Referring now to FIG. 3, an example method 300 is illustrated for providing notifications for camera resource availability that may be executed by operating system 110 (FIG. 1) on computer device 102 (FIG. 1).

At 302, method 300 may include receiving one or more requests for control of the camera resource. For example, camera resource control component 16 (FIG. 1) may receive a request from application 10 (FIG. 1) for control of camera resource 20 (FIG. 1). In addition, camera resource control component 16 may receive a plurality of requests for control of camera resource 20 from a plurality of applications 10. Applications 10 may request control of sensor 22 (FIG. 1) and one or more sensors 26 (FIG. 1). Alternatively, applications 10 may request control of sensor 22 or one or more sensors 26. Sensors 22 and 26 may include, but are not limited to, an IR sensor, a color sensor, a monochrome sensor, a depth sensor, a thermal sensor, or any other type of camera sensor. In an implementation, applications 10 may request control of a plurality of camera resources 20. For example, applications 10 may request control of sensors 22 and 26 of a first camera resource 20, sensor 26 of a second camera resource, and sensors 22 and 26 of a third camera resource.

At 304, method 300 may include determining whether another application has control of a camera resource. Camera resource control component 16 may determine whether another application has control of camera resource 20.

If another application does have control of a camera resource, at 306, method 300 may optionally include providing shared access to the camera resource. Camera resource control component 16 may provide other applications shared access to camera resource 20. For example, other applications than the application in control of camera resource 20 may be able to access camera resource 20 using the existing characteristics of the camera resource set by the application in control of camera resource 20.

At 308, method 300 may include providing control of the camera resource to an application. If another application does not have control of a camera resource, camera resource control component 16 may provide application 10 control of camera resource 20. In addition, if a plurality of applications 10 are requesting control of camera resource 20, camera resource control component 16, may provide control of camera resource 20 to one application 20 selected from the plurality of applications.

A variety of mechanism may be used to grant control of camera resource 20 to a requesting application 10. In some implementations, the applications 10 may "race" (e.g., first requestor wins) for the available camera resource 20 to gain control of camera resource 20. In other cases, a round robin mechanism may be implemented for sharing camera resource 20. In other cases, for example, the applications 10 may be prioritized and camera resource 20 may be assigned to the applications 10 based on a priority. For example, applications 10 may be prioritized based on efficiency. In addition, a portion of the camera resources may be reserved for a period of time for specific types of applications.

At 310, method 300 may include sending a control notification to one or more applications indicating that the application has control of the camera resource. Camera resource control component 16 may send a control notification of camera resource 20 notifying one or more applications that an application 10 has taken control of camera resource 20. For example, when an application 10 has acquired control of camera resource 20 and has started streaming in a control mode from the camera resource 20, a control notification may be sent to other applications on computer device 102 indicating that application 10 has control of camera resource 20. The control notification may be used by other applications to wait to request control of camera resource 20 instead of wasting resources on making requests when control of camera resource 20 is not available.

At 312, method 300 may include determining whether the application has released control of the camera resource. For example, when application 10 has stopped streaming from camera resource 20, control of camera resource may be released. In an implementation, camera resource control component 16 may determine whether application 10 has released control of camera resource 20. If application 10 is currently streaming from camera resource 20, camera resource control component 16 may determine that application 10 has not released control of camera resource 20.

At 314, method 300 may include sending an availability notification to one or more applications indicating that the application has released control of the camera resource. For example, when control is relinquished, camera resource 20 may send an availability notification to other applications on computer device 102 indicating that another application 10 has relinquished control of a camera resource 20. As such, the availability notification allows any application 10 that desires control of camera resource 20 to request control upon availability, rather than having to waste resources on making requests when the control of camera resource 20 is not available. The method may proceed to 302 when an application 10 requests control of camera resource 20.

One example may include Skype trying to initiate a video call while another application has control of the RGB camera resources and is operating the RGB camera at a lower resolution. While Skype prefers to have a higher resolution, based on receiving the notification that control of the RGB camera resources is held by another application, Skype may initiate the video call at the lower resolution that is available for sharing. When the application releases control of the RGB camera resources, a notification may be sent to Skype (and all other applications who have registered to receive such notifications) indicating the availability of the RGB camera resources. Upon receiving the notification, Skype may attempt to take control of the camera resource and have the call moved to a higher resolution.

Figure 4:
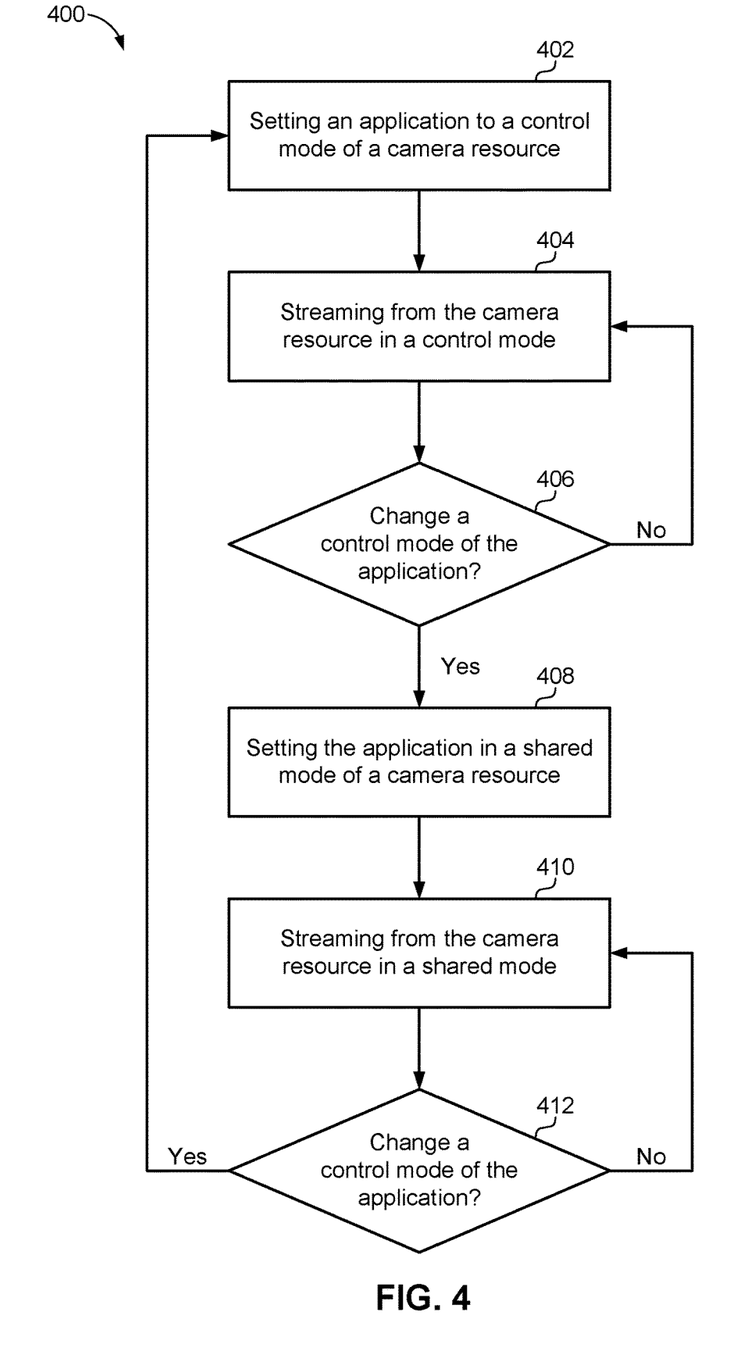
FIG. 4 is a flow chart of a method for dynamically switching control of a camera resource in accordance with an implementation of the present disclosure.

Referring now to FIG. 4, illustrated is an example method flow 400 for dynamically switching control of a camera resource that may be executed by operating system 110 (FIG. 1) on computer device 102 (FIG. 1).

At 402, method 400 may include setting an application to a control mode of a camera resource. When an application has control of a camera resource, the application may, for example, change a stream format of the camera resource, set controls on the camera resource, and/or stream from the camera resource as a control client. In addition, an application may want to perform advanced camera capture configurations such as, but not limited to, exposure control, advanced focus, and exposure compensation. For example, camera resource control component 16 may set mode 12 of application 10 to a control mode of camera resource 20.

At 404, method 400 may include streaming from the camera resource in a control mode. In an implementation, application 10 may have control of a portion of the camera resources 20 while sharing other portions of the camera resources 20 with other applications. For example, application 10 may control sensor 22 of camera resource 20 while sharing one or more sensors 26 with other applications. In another example, application 10 may control sensor 26 and may share sensor 26 with other applications. For example, Windows Hello may control IR sensor 22 and color sensor 26. Skype may try to initiate a video call while Windows Hello has control of color sensor 26 and is operating the RGB camera at a lower resolution. While Skype prefers to have a higher resolution, Skype may initiate the video call at the lower resolution that is available for sharing instead of not initiating the call. Skype may attempt to take control of the camera resource when available. In one implementation, application 10 may control a plurality of camera resources 20. For example, application 10 may control sensor 22 of a first camera resource 20 and control sensors 22 and 26 of a second camera resource 20 while sharing the first camera resource 20 and the second camera resource 20 with other applications. In addition, application 10 may control sensors 22 and 26 of a first camera resource and sensor 22 of a second camera resource 20 while sharing the second camera resource 20 with other applications.

At 406, method 400 may include determining whether to change a control mode of the application. In an implementation, camera resource control component 16 may determine whether application 10 needs control of camera resource 20. For example, if application 10 is performing video operations such as, but not limited to, exposure control, advance focus, or exposure compensation, camera resource control component 16 may determine that application 10 needs control of camera resource 20. In another implementation, application 10 may send a request to camera resource control component 16 to change a control mode of application 10 (e.g., to change from a controlling mode to a share mode). If camera resource control component 16 determines that an existing control of application 10 should remain the same, application 10 may continue to stream from camera resource 20 in a control mode.

At 408, method 400 may include setting the application in a shared mode of a camera resource. If camera resource control component 16 determines that an existing control of application 10 can be changed, camera resource control component 16 may set mode 12 of application 10 to a share mode. When in a shared mode, application 10 has a lesser amount of control on the camera resource 20. For example, application 10 cannot choose a media type, frame rate, resolution, control the brightness adjustment, exposure adjustment, white balance, ISO, zoom, and/or a focus adjustment of camera resource 20. Application 10 has to accept the given characteristics of camera resource 20, even if they are not preferable for the operation of the application operating in shared mode. As such, application 10 can dynamically lower itself to become a share client of camera resource 20.

For example, Skype may be in control of camera resource 20 and may be using color sensor 26 for the Skype call. While on the call a user may browse to a SharePoint website, which may be password protected via face authentication. The user may want to use the face authentication to access information and/or to share documentation while staying on the Skype call without interrupting the Skype call. The SharePoint website may send a request to use camera resource 20 for the face authentication. For example, the SharePoint website may need to use IR sensor 22 for authentication and color sensor 26 for anti-spoofing and lightness detection to ensure a user is not using an IR recorded photograph or video playback. Skype may downgrade to a sharing mode so that the SharePoint website may use IR sensor 22 and color sensor 26 to perform the face authentication while still maintaining the Skype call.

At 410, method 400 may also include streaming from the camera resource in a shared mode. When application 10 starts streaming from camera resource 20 in a share mode, application 10 may no longer control the stream format from camera resource 20.

At 412, method 400 may include determining whether to change a control mode of the application. Camera resource control component 16 may determine whether application 10 needs to regain control of camera resource 20. For example, application 10 may send a request to camera resource control component 16 to change a control mode of application 10 (e.g., to change from a shared mode to a controlling mode). If camera resource control component 16 determines that an existing control of application 10 should remain the same, application 10 may continue to stream from camera resource 20 in a shared mode. If camera resource control component 16 determines that mode 12 of application 10 should be changed to a control mode, the method may proceed to 402.

As such, applications may dynamically lower themselves from a controlling application of the camera resource to become a shared client of the camera resource and may reacquire control at a later time upon receiving a release notification of control of the camera resource. Thus, the system provides flexibility so that applications that need control of the camera resource may get control, while applications that need access to the camera resource may also access the camera resource, even if the application does not control the camera resource.

Figure 5:
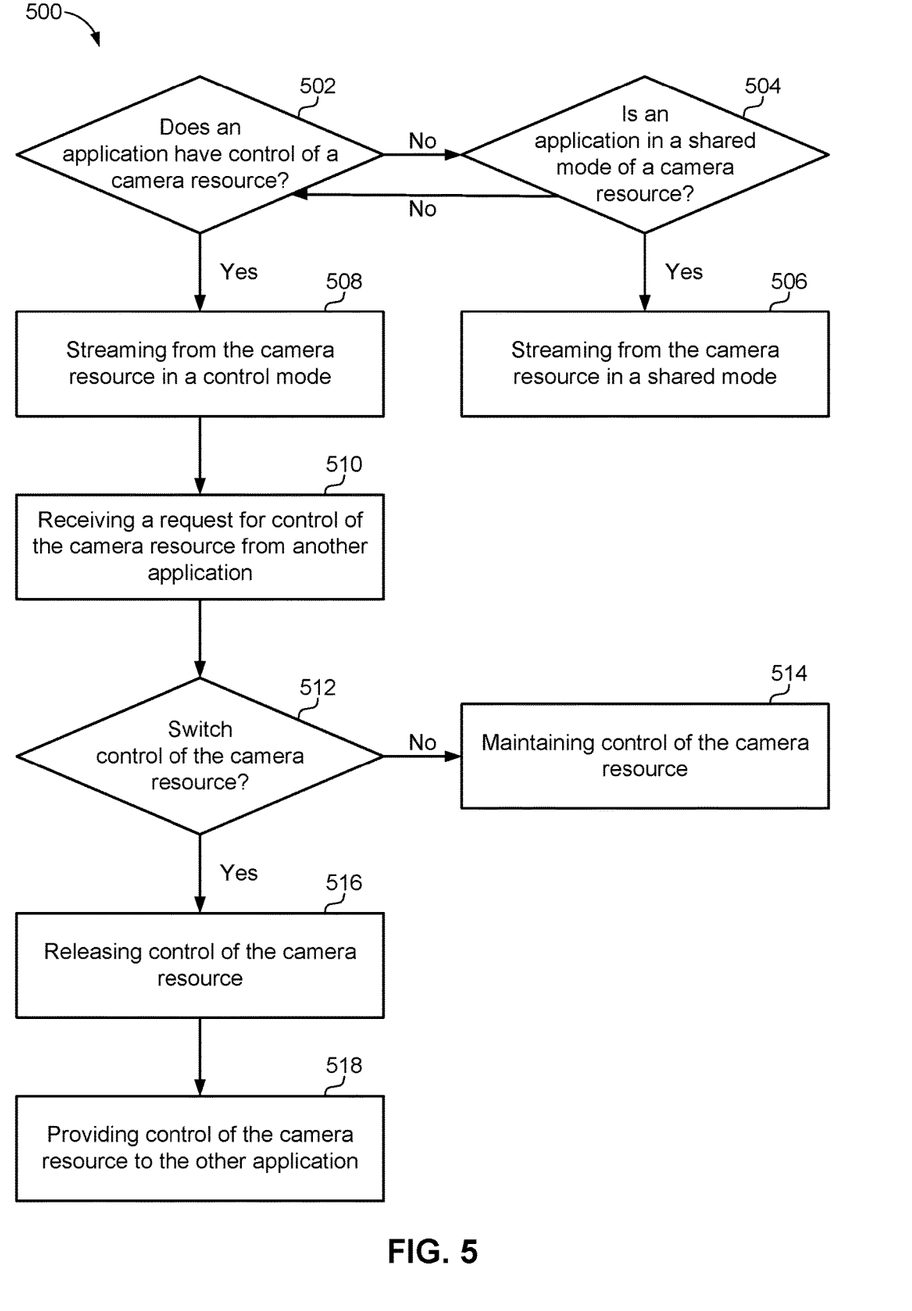
FIG. 5 is a flow chart of a method for dynamically switching control of a camera resource in accordance with an implementation of the present disclosure.

Referring now to FIG. 5, illustrated is an example method flow 500 for dynamically switching control of a camera resource that may be executed by operating system 110 (FIG. 1) on computer device 102 (FIG. 1).

At 502, method 500 may include determining whether an application has control of a camera resource. For example, if camera resource 20 has three pins (still, preview, and record), when application 10 is in control of camera resource 20, application 10 may view all three pins and access the operations of all three pins. Other applications in the share mode may only view the pins marked as shareable. For example, camera resource control component 16 may determine that mode 12 of application 10 is a control mode. In one implementation, application 10 may have control of a plurality of camera resources 20. As such, application 10 may be able to view all three pins and access the operation of all three pins for each of the camera resources 20 under the control of application 10.

At 504 and 506, method 500 may include determining whether an application is in a shared mode of a camera resource and streaming from the camera resource in a shared mode. If application 10 is not in control of camera resource, camera resource control component 16 may determine that mode 12 of application 10 is a shared mode. For example, if camera resource 20 has three pins (still, preview, and record) and the preview pin is marked as shareable, while no other pin is shareable, other applications in the shared mode will view camera resource 20 as a one pin camera (e.g., a preview only camera). As such, if other applications in the share mode attempt a mode other than what is shared (e.g., a capture mode), the operation will fail.

At 508, method 500 may include streaming from the camera resource in a control mode. When mode 12 of application 10 is a control mode, application 10 may stream from camera resource 20 in a control mode.

At 510, method 500 may include receiving a request for control of the camera resource from another application. Camera resource control component 16 may receive a request from another application for control of camera resource 20.

At 512, method 500 may include determining whether to switch control of the camera resource. For example, camera resource control component 16 may determine whether to switch control of the camera resource from the application currently in control to the requesting application. In an implementation, camera resource control component 16 may determine whether the requesting application has a higher priority of the application in control of the camera resource. In another implementation, application 10 may notify camera resource control component 16 that application 10 will release control of camera resource 20 when another application requests control of camera resource 20. For example, Mixed Reality Capture (MRC) application may be in control of camera resource 20 but may release control of camera resource 20 whenever another application requests control of camera resource 20.

At 514, method 500 may include maintaining control of the camera resource. For example, if camera resource control component 16 determines that the requesting application does not have a higher control priority of application 10, the mode of application 10 may remain in control mode and application 10 may maintain control of camera resource 20.

At 516, method 500 may include releasing control of the camera resource. If camera resource control component 16 determines that control of camera resource 20 should be switched to the requesting application, camera resource control component 16 may release the control of the camera resource 20 from application 10.

At 518, method 500 may include providing control of the camera resource to the other application. For example, camera resource control component 16 may change the mode 12 of the requesting application to a control mode. Thus, the requesting application may modify the stream format, set controls of camera resource 20, and stream from camera resource 20 as a controlling application.

The method may also include changing the mode of the application from a shared mode to a control mode when the requesting application releases control of the camera resource. For example, camera resource control component 16 may change the control mode of application 10 from a shared mode to a control mode. When the requesting application releases control of camera resource 20, application 10 may send a request to camera resource control component 16 to change the control mode of application 10 from a shared mode to a control mode.

As such, the described implementations allow pre-emption of a control mode by another application, such as, when an application having a higher priority desires to use camera resources already under control by an application having a lesser control priority.

Figure 6:
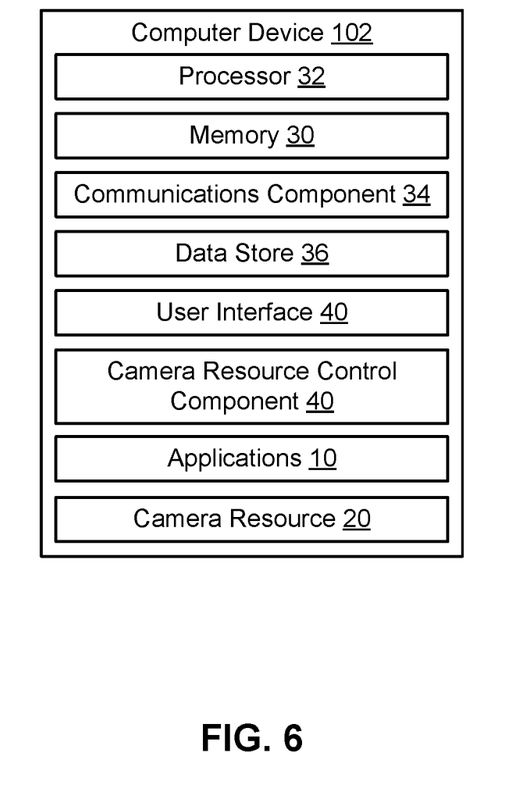
FIG. 6 is a schematic block diagram of an example device in accordance with an implementation of the present disclosure.

Referring now to FIG. 6, illustrated is an example computer device 102 in accordance with an implementation, including additional component details as compared to FIG. 1. In one example, computer device 102 may include processor 32 for carrying out processing functions associated with one or more of components and functions described herein. Processor 32 can include a single or multiple set of processors or multi-core processors. Moreover, processor 32 can be implemented as an integrated processing system and/or a distributed processing system.

Computer device 102 may further include memory 30, such as for storing local versions of applications being executed by processor 32. Memory 30 can include a type of memory usable by a computer, such as random access memory (RAM), read only memory (ROM), tapes, magnetic discs, optical discs, volatile memory, non-volatile memory, and any combination thereof. Additionally, processor 32 and memory 30 may include and execute operating system 110 (FIG. 1).

Further, computer device 102 may include a communications component 34 that provides for establishing and maintaining communications with one or more parties utilizing hardware, software, and services as described herein. Communications component 34 may carry communications between components on computer device 102, as well as between computer device 102 and external devices, such as devices located across a communications network and/or devices serially or locally connected to computer device 102. For example, communications component 34 may include one or more buses, and may further include transmit chain components and receive chain components associated with a transmitter and receiver, respectively, operable for interfacing with external devices.

Additionally, computer device 102 may include a data store 36, which can be any suitable combination of hardware and/or software, that provides for mass storage of information, databases, and programs employed in connection with implementations described herein. For example, data store 36 may be a data repository for applications 10 (FIG. 1), camera resource control API 14 (FIG. 1) camera resource control component 16 (FIG. 1) and/or camera resource 20 (FIG. 1).

Computer device 102 may also include a user interface component 40 operable to receive inputs from a user of computer device 102 and further operable to generate outputs for presentation to the user. User interface component 40 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 40 may include one or more output devices, including but not limited to a display, a speaker, a haptic feedback mechanism, a printer, any other mechanism capable of presenting an output to a user, or any combination thereof.

Computer device 102 may additionally include camera resource control component 16 (FIG. 1) configured to control camera resources 20 (FIG. 1) sharing between applications 10 (FIG. 1). Camera resource 20 may include at least one sensor 22 (FIG. 1). In addition, camera resource 20 may include one or more additional sensors 26 (FIG. 1). Sensors 22 and 26 may include, but are not limited to, an infrared (IR) sensor, a color sensor, such as a red green blue (RGB) sensor, a monochrome sensor, a depth sensor, a thermal sensor, or any other type of camera sensor. In addition, computer device 102 may include camera resource control API 14 (FIG. 1) configured to receive and/or transmit communications between applications 10 and camera resource control component 16. In an implementation, user interface component 40 may transmit and/or receive messages corresponding to the operation of camera resource control API 14, camera resource control component 16, camera resource 20 and/or applications 10. In addition, processor 32 executes camera resource control component 16, camera resource 20, camera resource control API 14 and/or applications 10, and memory 30 or data store 36 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various implementations are described herein in connection with a device (e.g., computer device 102), which can be a wired device or a wireless device. A wireless device may be a cellular telephone, a satellite phone, a cordless telephone, a Session Initiation Protocol (SIP) phone, a wireless local loop (WLL) station, a personal digital assistant (PDA), a handheld device having wireless connection capability, a computer device, a mixed reality or virtual reality device, or other processing devices connected to a wireless modem.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device, comprising:
a memory to store data and instructions;
a processor in communication with the memory; and
an operating system in communication with the memory and the processor, wherein the operating system is operable to:
receive requests from a plurality of applications for control of a camera resource;
provide control of the camera resource to a selected application from the plurality of applications when the camera resource is available;
send a control notification, to one or more applications that include at least one of the plurality of applications, indicating that the selected application has control of the camera resource;
receive a request from a requesting application from the one or more applications to share the camera resource;
provide the requesting application with a shared access to the camera resource while the selected application has control of the camera resource; and
send an availability notification to the one or more applications that received the control notification in response to the selected application releasing control of the camera resource, wherein the availability notification indicates that the selected application has released the control of the camera resource.

2. The computer device of claim 1, wherein the operating system is further operable to receive at least one request from the one or more applications for control of the camera resource based on the availability notification.

3. The computer device of claim 1, wherein the operating system is further operable to provide control of the camera resource to the selected application based on a priority of the selected application.

4. The computer device of claim 1, wherein the operating system is further operable to provide control of the camera resource to the selected application based on a round robin mechanism.

5. The computer device of claim 2, wherein the operating system is further operable to reserve a portion of the camera resources for the one or more applications for a period of time.

6. The computer device of claim 1, wherein when the selected application is in control of the camera resource, the selected application determines characteristics of the camera resource.

7. The computer device of claim 1, wherein the shared access to the camera resource is based on the existing characteristics of the camera resource set by the selected application.

8. The computer device of claim 1, further comprising:
a plurality of camera resources, wherein each of the plurality of camera resources includes a plurality of sensors: and
wherein the operating system is further operable to provide control of one or more of plurality of camera resources to the selected application when no other application has control of the one or more camera resources.

9. A method for providing notifications for camera resource availability, comprising:
receiving, at an operating system executing on a computer device, requests from a plurality of applications for control of a camera resource;
providing, by the operating system, control of the camera resource to a selected application from the plurality of applications when the camera resource is available;
sending, by the operating system, a control notification, to one or more applications that include at least one of the plurality of applications, indicating that the selected application has control of the camera resource;
receiving a request from a requesting application from the one or more applications to share the camera resource;
providing the requesting application with a shared access to the camera resource while the selected application has control of the camera resource; and
sending, by the operating system, an availability notification to the one or more applications that received the control notification in response to the selected application releasing control of the camera resource, wherein the availability notification indicates that the selected application has released the control of the camera resource.

10. The method of claim 9, further comprising receiving at least one request from the one or more applications for control of the camera resource based on the availability notification.

11. The method of claim 9, further comprising providing control of the camera resource to the selected application based on a priority of the requesting applications.

12. The method of claim 9, further comprising providing control of the camera resource to the selected application based on a round robin mechanism.

13. The method of claim 10, further comprising reserving a portion of the camera resources for the one or more applications for a period of time.

14. The method of claim 9, wherein when the selected application is in control of the camera resource, the selected application determines characteristics of the camera resource.

15. The method of claim 9, wherein the shared access to the camera resource is based on the existing characteristics of the camera resource set by the selected application.

16. The method of claim 9, further comprising a plurality of camera resources, wherein each of the plurality of camera resources includes a plurality of sensors, and
providing control of one or more of plurality of camera resources to the selected application when no other application has control of the one or more camera resources.

17. A non-transitory computer-readable medium storing instructions executable by a computer device, comprising:
at least one instruction for causing the computer device to receive requests from a plurality of applications for control of a camera resource;
at least one instruction for causing the computer device to provide control of the camera resource to a selected application from the plurality of applications when the camera resource is available;
at least one instruction for causing the computer device to send a control notification, to one or more applications that include at least one of the plurality of applications, indicating that the selected application has control of the camera resource;
at least one instruction for causing the computer device to receive a request from a requesting application from the one or more applications to share the camera resource;
at least one instruction for causing the computer device to provide the requesting application with a shared access to the camera resource while the selected application has control of the camera resource; and
at least one instruction for causing the computer device to send an availability notification to the one or more applications that received the control notification in response to the selected application releasing control of the camera resource, wherein the availability notification indicates that the selected application has released the control of the camera resource.

18. The computer-readable medium of claim 17, wherein the shared access to the camera resource is based on the existing characteristics of the camera resource set by the selected application.

19. The computer-readable medium of claim 17, wherein when the selected application is in control of the camera resource, the selected application determines characteristics of the camera resource.

20. The computer-readable medium of claim 17, wherein the shared access to the camera resource is based on the existing characteristics of the camera resource set by the selected application.

* * * * *